United States Patent Office 3,361,344
Patented Jan. 2, 1968

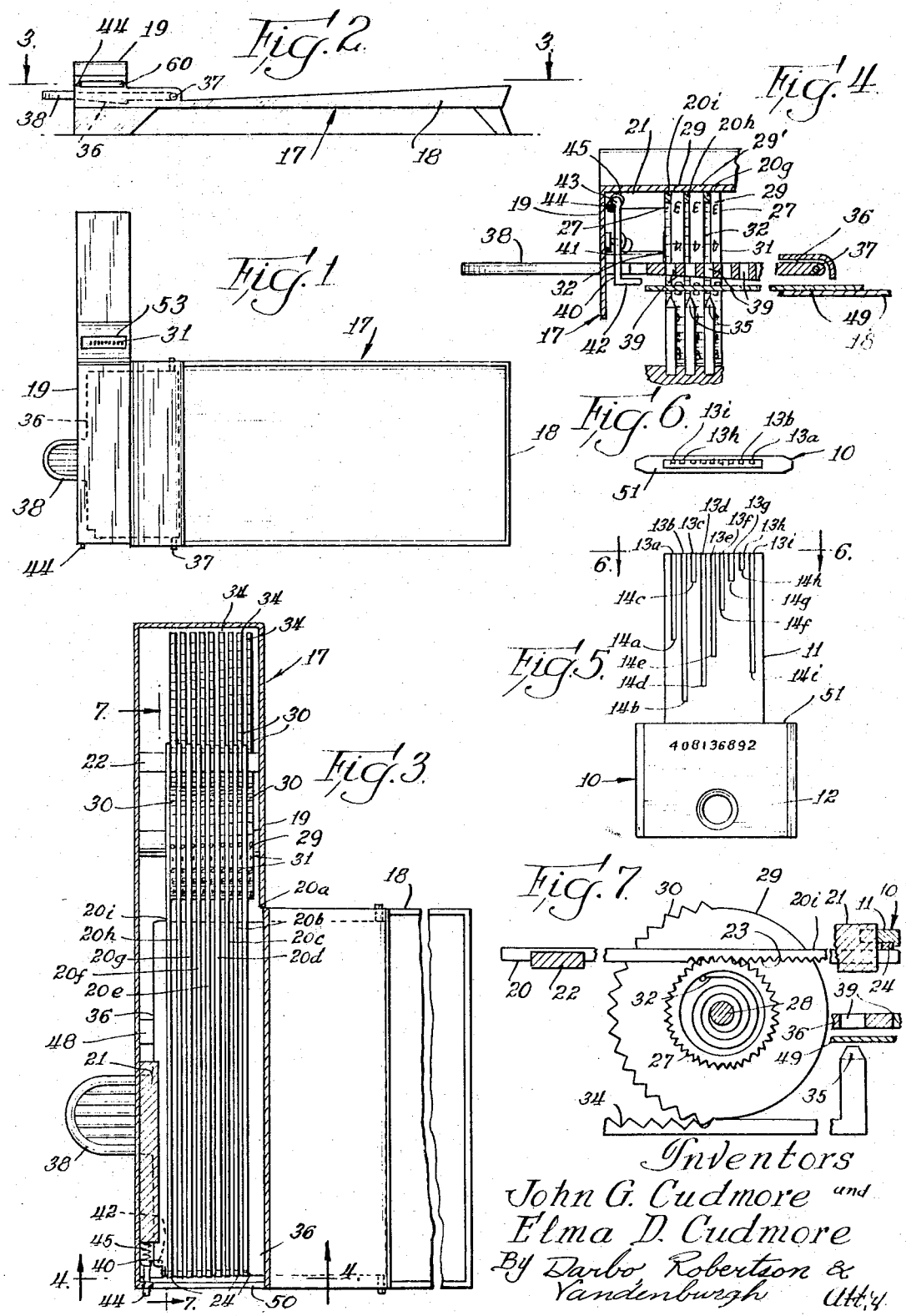

3,361,344
RECORD-MAKING APPARATUS
Elma D. Cudmore and John G. Cudmore, both of 1255 Valley Road, Bannockburn, Ill.
Filed Nov. 29, 1965, Ser. No. 510,352
3 Claims. (Cl. 234—45)

The present invention relates to an apparatus for use in the preparation of accounting and bookkeeping records and the like, and the following disclosure thereof is offered for public dissemination upon a grant of a patent therefor.

The use of credit cards in the purchasing of goods and services is becoming more and more prevalent. It is not an unlikely possibility that similar procedures will be used in the future as an alternative to the present procedure of paying for goods and services by writing a check on funds upon deposit in a bank. Thus, instead of writing a check, a form will be filled out when a person makes a purchase, which form authorizes the bank or other agency to pay the funds directly to the seller of the goods or services and to charge the amount to the account of the purchaser.

If the accounting record, or the order to pay, made out at the time of the sales transaction is written out longhand, there obviously is little advantage or time saving over the procedure of writing a check. However, if the notations are made mechanically and in such a form that automatic accounting equipment can perform the subsequent processing, charging of account, etc., there will be a great saving in time and effort, both in the initial transaction and in the various steps necessary to ultimately charge the bank or other account of the purchaser. The principal object of the present invention is to provide an apparatus that will facilitate this practice.

In the present charge account practices the usual procedure is to provide each individual with a card or plate that identifies the individual. This card or plate is then employed (with an inked ribbon or carbon paper) to print the individual's identification upon the paper that records the transaction. The problem with such devices as presently used is that, as the various bookkeeping and record transactions are made from the paper that was used to initially record the transaction, it is necessary for a person to read the individual's identification from the paper. In the present invention this disadvantage is eliminated by coding the paper or card upon which the original transaction is recorded in a manner such that this identification of the individual on the original record sheet or card may be read by automatic bookkeeping and accounting apparatus. In addition to making the record on cards, it could be punched tape, magnetic tape, visual or special sensitive tape, etc.

To this end, each individual is provided with a key which is coded so as to identify that particular individual, for example, his social security number. In addition to being coded to identify the individual, it can also be coded to identify his bank or the lending agency which accepts his charges. At the time the sales transaction takes place, the transaction is recorded on an accounting card, preferably in the form of indicia that can be machine read, but alternatively in writing. After the purchaser has scanned the card to verify the correctness of the recorded transaction, the card is put into an "acceptor" of the present invention. The individual's key is then inserted into the acceptor to record on the card, in a form that may be machine read, the identification of the individual and, if used, the identification of his bank or lending agency.

Further objects and advantages will be apparent from the following description taken in conjunction with the drawings in which:

FIGURE 1 is a plan view of an acceptor embodying the present invention;
FIGURE 2 is a side elevation of the acceptor of FIGURE 1;
FIGURE 3 is a section as viewed at line 3—3 of FIGURE 2;
FIGURE 4 is a section as viewed at line 4—4 of FIGURE 3;
FIGURE 5 is a plan view of an identification key employed in the present invention;
FIGURE 6 is an end view as viewed at line 6—6 of the key of FIGURE 5; and
FIGURE 7 is an enlarged partial section as viewed at line 7—7 of FIGURE 3.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirements of pointing out the parts, improvements, or combinations in which the inventive concepts are found.

Every individual who wished to avail himself of the system afforded by the present invention would be supplied with an identification key generally 10. The illustrated key is in the form of an elongated web 11 having a handle 12 at one end thereof. Extending inwardly from the opposite end of web 11 are a plurality of slots or grooves 13a through 13i respectively. At the inner ends of slots 13 the key forms abutments 14a through 14i respectively. The length of each slot is such as to correspond to a given number. Thus, key 10 is coded for number 408,136,892. Slot 14a has a length representing the number 4. Slot 13g has a length representing the number 8. Slot 13i has a length representing the number 2, etc. Thus, this key would represent a particular individual who has been assigned number 408,136,892. Other keys might be employed in which one set of slots identified an individual and another set of slots identified a particular bank, lending agency or the like.

The acceptor with which the key 10 is employed is identified in the drawings by the general number 17. It comprises a card receiving tray 18 having a housing 19 at one end thereof. Within housing 19 are a plurality of slides 20a through 20i corresponding in number to the number of identification slots in key 10. Slides 20 are movable longitudinally in supports 21 and 22. The inner ends of slides 20 have teeth 23 in the form of a rack. At the other end each slide 20 has a feeler 24.

The teeth 23 of each slide engage a toothed wheel 27 rotatably mounted on a shaft 28. A wheel 29 having teeth 30 about half the periphery thereof is secured to toothed wheel 27. Wheel 29 has indicia 31 from zero to nine about the other half of the periphery. A spring 32 connects shaft 28 and toothed wheel 27, urging the wheel 27 in a clockwise direction as viewed in FIGURE 7.

Racks 34 are positioned to engage the teeth 30 of wheels 29. Racks 34 are slidably mounted in housing 19 and have cutters or punches 35 on the ends thereof.

A pressure plate 36 is pivotally connected to housing 19 at hinge 37. Pressure plate 36 has an operating handle 38 extending outwardly through an opening in the side of housing 19. It also has a plurality of openings 39 corresponding in position and location to the various positions that may be assumed by the various punches 35. A latch 40 is pivotally secured to housing 19 by a pin 41. Latch 40 has a bottom finger 42 which lies under pressure plate 36 and an upper end 43. A pin 44 is slidably mounted in housing 19 in a position to contact upper end 43 of the latch. A spring 45 mounted on support 21 bears against the rear side of end 43.

The sides of tray 18 and portions of housing 19, such as stop 48, form guides to accurately position an accounting card 49 in the acceptor. Before the accounting card is put into the acceptor, it presumably has had placed thereon, either in the form of writing or in the form of suitable marking (or punched holes) that can be read by automatic equipment, the details of the sales transaction that has taken place. With the card in the acceptor, the key 10 is inserted through the keyway in the acceptor defined by keyhole opening 50. The key is inserted with the slots 13 downwardly and is pushed in until the side 51 bears against pin 44 and pushes the pin all the way in. As pin 44 is pushed in, it pushes against the top 43 of latch 40 pivoting the latch so that the finger 42 moves out from under pressure plate 36. This releases the pressure plate so that it can be now moved downwardly.

As the key is moved in, the abutments 14 at the end of the slots 13 in the key engage feelers 24 so that slides 20 are moved inwardly (to the left in FIGURE 7) a distance proportional to the length of the slots in the key. Thus, for example, abutment 14i engages the feeler 24 of slide 20i and pushes the slide inwardly a distance corresponding to the number 2. As it does so, slide 20i rotates the respective toothed wheel 27 which, in turn, rotates respective wheel 29. The rotation of wheel 29, in turn, moves rack 34 in engagement therewith to position punch 35 thereof at a location with respect to card 49 that corresponds to the number 2.

When the key is all the way in and pressure plate 36 released, the pressure plate is moved downwardly by a suitable movement of handle 38. This forces card 49 onto punches 35 so that the punches go through the card causing perforations therein. The location of these perforations are such as to identify the number 408,136,892 with which the key 10 was coded. Thus, the card now is coded in a manner which may be read visually or by automatic equipment in the manner in which the well-known "IBM" cards are read. When key 10 is removed, springs 32 return the wheels, punches and slides to their original position.

This coding on the card will be accurate since the alignment of the card was fixed by the acceptor and the alignment of the punches with respect to the card was determined by the acceptor in response to the coding on the key. Until the key was completely into its proper position in the acceptor, latch 40 is not released, and thus only after the proper positioning can the card 49 be punched. By permitting his key to be employed, the purchaser has given his stamp of accuracy and authenticity to the transaction. While the described apparatus is manually operated, it will be apparent that slide 44 could actuate an electrical switch to cause suitable electrical mechanism to move the pressure plate 36 against card 49 and result in the perforating of the card. When the key is properly inserted into the acceptor and wheels 27 and 29 rotated into the position corresponding to the coding of the key, the indicia 31 on the wheels 29 can be read through window 53 to verify the number with which the key 10 is coded.

The length of the path of movement of punches 35 is determined by the spacial characteristics of card 49 and of the reading equipment with which it is employed. This, in turn, in conjunction with the size of web 11 of the key 10, will determine the relationship of the size of the two wheels 27 and 29. In the illustrated embodiment wheels 29 are twice as large as wheel 27.

We claim:
1. A record-keeping apparatus for use in conjunction with a plurality of individuals, each of which has been assigned a unique identification number, said apparatus comprising: a plurality of keys, each key having means to code the key with the number of a particular individual; an acceptor to receive one of said keys at a time and having means engaging the received key means for recording the coded number of the received key including a card, slidable racks each engaging a first toothed wheel positioned by end contact with a key coding means, a larger toothed wheel attached to each first toothed wheel and rotatable with it having designating numbers on its periphery a common transverse shaft on which all of said wheel pairs are separately rotatable, a punch slide having a rack engaged by each larger wheel at the side opposite the rack contact with the first wheel, means to press the card against the punches of said punch slides in accordance with their positions by said key recording means, and said apparatus having an opening in its casing transverse to the larger wheels and adjacent to their peripheries through which said numbers on the wheels appear, thereby making visible the coded numbers of the received key.

2. An apparatus according to claim 1 in which the punch racks have punch projections extending upwardly from the lower periphery of the said larger wheels, the card located above the ends of the punch projections, a movable pressure plate pivoted to the inside of the casing over the end of a card, means comprising an operating handle for the pressure plate, extending from the casing and normally holding the plate above a card and out of card punching position, and spring latch means to engage below the plate having a projection from the casing adapted to be engaged by the key when fully inserted to displace the latch from below the plate allowing depression of the pressure plate by the said handle.

3. An apparatus according to claim 1 in which the said first and larger toothed wheels of each of said wheel pairs are rotated a corresponding amount on said common transverse shaft by the insertion of the said key against the end of the slide rack on top of the smaller wheel and moving the slide rack engaging the corresponding larger wheel a proportionally greater distance, and a coil spring surrounding the shaft and connected at one end to the shaft and at the other to the one wheel of each pair of wheels tending to rotate them in a direction such that the end of the slide rack engaging the smaller wheel will resiliently oppose the insertion and movement of the said key in engagement with its coding means and will return the pair of wheels to a key engaging position when the key is withdrawn.

References Cited

UNITED STATES PATENTS 3,008,634  11/1961  Pennington _____ 234—45 X

WILLIAM S. LAWSON, *Primary Examiner.*